No. 749,800. Patented January 19, 1904.

UNITED STATES PATENT OFFICE.

CHARLES MOUREU, OF PARIS, FRANCE.

HOMOLOGOUS PROPIOLIC ACID AND PROCESS OF MAKING SAME.

SPECIFICATION forming part of Letters Patent No. 749,800, dated January 19, 1904.

Application filed July 19, 1901. Serial No. 68,944. (Specimens.)

*To all whom it may concern:*

Be it known that I, CHARLES MOUREU, of Paris, France, have invented certain new and useful Improvements in the Production of Homologous Propiolic Acids and Their Derivatives, which improvements are fully described in the following specification.

This invention relates, broadly, to the production of certain homologous propiolic acids (carboxylic acids of the acetylene family) which have important technical or industrial uses, and specifically to an acid of the series $C_8$ (amyl propiolic acid

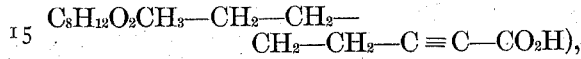

and its next higher homologue of the series $C_9$ (hexyl propiolic acid

and derivatives thereof, such as the ethers, and particularly the beta ketonic ethers. The process for the production of these acids consists in treating an alkaline or earth alkaline compound—for example, the sodium derivative—of normal heptin 1 (or of its homologue, normal octin 1) with carbon dioxid. The formula of normal heptin 1 is

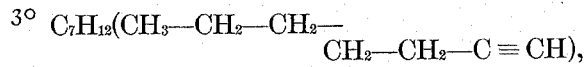

and that of normal octin 1 is

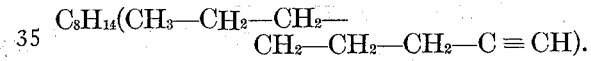

Free amyl propiolic acid liberated from the sodium salt is a liquid of the formula $C_8H_{12}O_2$, which possesses the following characteristics: boiling-point 148° to 151° under twenty to twenty-one millimeters pressure; density at 18° centigrade, 0.967. Its combination with phenylhydrazin of formula $C_{14}H_2ON_2O_2$ melts at 96°.

Free hexylpropiolic acid

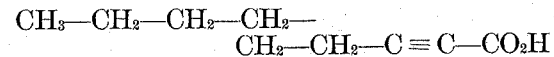

liberated from the sodium salt is a liquid of the formula $C_9H_{14}O_2$ distilling at 153° to 156° under eighteen to nineteen millimeters pressure. Density at 0°, 0.964.

I have found that the two homologous acids will serve as the starting-points for the production of a series of derivatives capable of various industrial applications—for example, in confectionery, perfumery, or other similar industries. The derivatives of the hexylpropiolic acid possess very nearly the same industrial effects as the corresponding derivatives of its lower homologue, the amylpropiolic acid. These acids may be obtained, for example, by proceeding in the following manner: The hydrocarbons, normal heptin 1 (which can be prepared by heating chloroenanthyliden with caustic potash, as explained in *Behal*, sixth edition, Vol. 15, p. 427, or *Beilstein*, 1893, Vol. 1, pp. 134, 135, 238) or normal octin 1 (which can be made from methylhexylcarbinol, as explained in *Behal*, sixth edition, Vol. 15, p. 429, or *Beilstein*, 1893, Vol. 1, pp. 134, 135, 238) well dried—for example, upon melted potash—are dissolved in a suitable solvent, (such as anhydrous ether or other solvent,) and there is added for each molecule of the hydrocarbon an atom (or slightly more) sodium in small pieces or granulated, the desired precaution being taken to prevent evaporation of the ether. The reaction is allowed to take place by itself and is completed, if necessary, at a low heat. The same reaction will take place if for sodium another alkaline metal or earth metal, (as potassium, calcium, magnesium, &c.,) be substituted. Into the product thus obtained and which it is unnecessary to separate from the ether a current of carbon dioxid previously dried is caused to pass for a sufficient time to transform the sodium derivative into sodium salt of the new acids above described. If care be taken to avoid loss of ether by evaporation, the end of the reaction may be ascertained by the increase of weight. The product of this reaction is allowed to drop little by little into water, so as to dissolve the sodium salt and, on the other hand, to destroy any small amount of sodium which may not have taken part in the reaction. The alkaline solution is then decanted off and washed with a suitable solvent—ether, for example. It is then acidulated with a slight excess of strong acid—for example, sulfuric acid. In this way the new acids from heptin or octin are set at liberty in the form of an oil which floats upon the surface of the liquid. The product is extracted several times with ether, (or other suitable solvent,) which may be added before or after separating the product from the liquid upon which it floats, the ethereal liquors are united, washed with water to remove any acidity of sulfuric acid, and the ethereal solution is dried as well as possible by chlorid of calcium or any other analogous drying agent. The ether is separated by distillation and the residue purified by fractional distillation *in vacuo*.

The acids when treated in accordance with the usual standard or academical processes for preparing acid chlorids—for example, when phosphorus perchlorid is caused to act upon the acid—give the corresponding chlorid compounds. The isolation is effected by the ordinary methods.

The acid chlorids react with the amids, giving the corresponding substituted amids.

The ethers of the acids can be prepared directly by the known etherification processes—for example, by simply heating the alcohol with the acids—or through the intermediation of an etherifying agent, such as sulfuric acid. These ethers may likewise be obtained, starting directly from the sodic hydrocarbons, by the action of the chloroformic ethers C₁—COOR. These ethers when they are treated with sulfuric acid and the product of the reaction is poured into water give the corresponding beta ketonic ethers by fixation of a molecule of water. The same beta ketonic ethers (for example, the ethylic ethers CH₃—CH₂—CH₂—CH₂—CH₂—
                  CO—CH₂—CO₂—C₂H₅
and
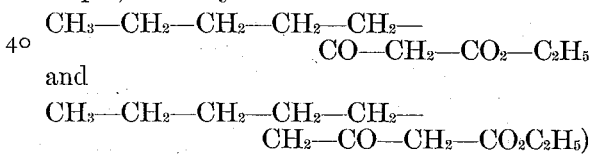

can also be obtained by submitting the acids to the action of alkalies in aqueous solution and afterward etherifying the beta ketonic acid obtained. For example, the operation may be as follows: The acid is heated with an excess of potash in alcoholic solution for some hours. The liquor is diluted with water acidulated with a strong acid—for example, sulfuric acid—and is extracted with ether or other appropriate solvent. The etheric solution is washed with water and dried. The ether is evaporated in the cold—for example, *in vacuo*—and the residue thus obtained, in general solid, is etherified in the cold by saturating its alcoholic solution with hydrochloric-acid gas. The beta ketonic ether produced is finally rectified by distillation *in vacuo*.

The ethers of the beta ketonic acid possess the following characteristics: Methylic ether distils at 114° to 118° under sixteen to eighteen millimeters pressure. Ethylic ether distils at 120° to 124° at sixteen to eighteen millimeters pressure. All these ethers possess aromatic properties and are suitable for employment more particularly in the manufacture of essences, perfumery, confectionery, soap, and similar products.

The chlorid of the acid C₈H₁₂O₂ boils at 87° to 91° under a pressure of seventeen to eighteen millimeters. Its density is 1.02 at temperature 0°. The chlorid of the acid C₉H₁₄O₂ boils at 112° to 118° under a pressure of twenty-three to twenty-four millimeters. Its density is 1.00. The substituted amids to which these chlorids give rise have the following characteristics: That obtained of the acid C₈H₁₂O₂ with o-toluidin melts at 59° to 61°. That obtained of the acid C₈H₁₂O₂ with p-toluidin melts at 67° to 69°. That obtained of the acid C₈H₁₂O₂ with p-anisidin melts at 43° to 45°. That obtained of the acid C₈H₁₂O₂ with α-naphthylamin melts at 113° to 115°.

The substituted amids of the acid C₉H₁₄O₂ obtained with p-toluidin melts at 63°, that obtained with α-naphthylamin at 99° to 100°.

The ethers of the acid

CH₃—CH₂—CH₂—CH₂—CH₂—C≡C—CO₂H possess the following characteristics: Methylic ether distils at 105° to 109° under twenty to twenty-one millimeters pressure; density at 0°, 0.952. Ethylic ether distils at 114° to 117° under seventeen to eighteen millimeters pressure density at 0°, 0.939. Isopropylic ether distils at 125° to 128° under twenty-two to twenty-three millimeters pressure; density at 0°, 0.918. Isobutylic ether distils at 137° to 140° under twenty-three to twenty-four millimeters pressure; density at 0°, 0.916. Iso-amylic ether distils at 147° to 150° under twenty to twenty-one millimeters pressure; density at 0°, 0.911. Allylic ether distils at 123° to 129° under seventeen to nineteen millimeters pressure; density at 0°, 0.946. Benzylic ether distils at 184° to 190° under sixteen to eighteen millimeters pressure; density at 0°, 1.023.

The ethers of the acid

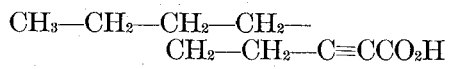

possess the following characteristics: Methylic ether distils at 121° to 123° under nineteen millimeters pressure; density at 0°, 0.933. Ethylic ether distils at 126° to 128° under sixteen millimeters pressure; density at 0°, 0.922. Isopropylic ether distils at 145° to 149° under thirty-one millimeters pressure; density at 0°, 0.910. Isoamylic ether distils at 167° to 172° under twenty-six millimeters pressure; density at 0° 0.907.

It will be understood that the present invention embraces the new amyl propiolic acid (or its next higher homologue, hexyl propiolic acid) whether in a free state or in combination.

While this application is designed to cover the broad invention, I do not herein claim specifically the ethers of amyl and hexyl propiolic acid, which are made the subject of a divisional application, No. 146,003, filed March 3, 1903.

Having now fully described my said invention, what I claim is—

1. The process of producing carboxylic acids of the acetylene family known as homologous propiolic acids of the series $C_8$ or $C_9$ by treating with carbon dioxid an alkaline compound of the described hydrocarbons.

2. A composition of matter containing a carboxylic, that is homologous propiolic, acid of the acetylene family of the series herein described, said acid being in the free state an oily liquid of specific gravity from 0.964 to 0.967, and boiling at 148° to 156° at eighteen to twenty-one millimeters pressure, and having the two other characteristics herein specified.

In witness whereof I have hereunto signed my name in the presence of two subscribing witnesses.

CHARLES MOUREU.

Witnesses:
JULES ARMENGAUD, Jeune,
MARCEL ARMENGAUD.